3,041,294
PROCESS FOR THE PRODUCTION OF EXPANDABLE POLYAMIDES
Friedrich Becke, Heidelberg, and Kurt Wick, Ludwigshafen (Rhine), Germany, assignors to Badische Anilin- & Soda-Fabrik Aktiengesellschaft, Ludwigshafen (Rhine), Germany
No Drawing. Filed July 6, 1960, Ser. No. 41,015
Claims priority, application Germany July 10, 1959
12 Claims. (Cl. 260—2.5)

This invention relates to the production of expandable polyamides.

It is an object of this invention to produce expandable polyamides from which homogeneous expanded articles can be manufactured in a simple manner.

A further object of the invention is to produce expandable polyamides which are capable of being stored over long periods of time.

These and further objects can be achieved according to the invention by condensing polyamide-forming compounds at temperatures between about 150° and 240° C. in admixture with carboxylic acid esters and hydroxyalkyl diamines until the condensate formed has a $k$-value between 20 and 100.

By "polyamide-forming substances" we understand compounds which, by polycondensation with formation of water or by polymerization, are converted into high molecular weight compounds in the molecules of which the radicals of the polyamide-forming initial compounds frequently recur and are linked with one another by way of amide groups. Polyamide-forming compounds are therefore diamines together with dicarboxylic acids, especially the salts of the said compounds with one another, aminocarboxylic acids and their inner amides, i.e. lactams. The compounds are predominantly of an aliphatic or a cycloaliphatic nature. Individual examples of such compounds are adipic acid with hexamethylene diamine, sebacic acid with hexamethylene diamine, or suberic acid with octamethylene diamine, omega aminocarboxylic acids, as for example omega-caproic acid, caprolactam, oenanthic lactam, caprylic lactam or mixtures of these with each other or with other polyamide-forming compounds.

Suitable carboxylic acid esters are the esters of carboxylic acids containing 1 to 3 carbon atoms, as for example formic acid, oxalic acid, acetic acid and propionic acid, and polyhydric aliphatic or cycloaliphatic alcohols. By polyhydric alcohols we mean alcohols which contain more than one hydroxyl group in the molecule. Thus for example the following esters of monocarboxylic acids can be used: ethylene glycol diformiate, propylene glycol diformiate, glycerine diformiate, glycerine triformiate, trimethylol propane diformiate, trimethylol propane triformiate, pentaerythritol formiate, tetramethylol cyclohexanol formiate, diethanol amino diformiate and ethylene glycol diacetate. Ethylene glycol oxalate is an example of a suitable ester of a dicarboxylic acid.

The hydroxyalkyl diamines according to our invention correspond to the general formula:

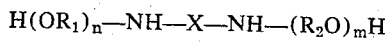

in which X is a divalent aliphatic, cycloaliphatic or aromatic radical, possibly containing a hetero atom, $R_1$ and $R_2$ are identical or different alkylene radicals with 1 to 4 carbon atoms, and $n$ and $m$ are integers between 0 and 7, the total of $n$ plus $m$ being at least 1. Among the hydrocarbon radicals $R_1$ and $R_2$ which contain 3 and 4 carbon atoms, those are preferred in which 2 of the carbon atoms form a straight line with the oxygen atom. The hydroxyalkyl diamines may also bear on nitrogen still further saturated or unsaturated aliphatic groups. Such hydroxyalkyl diamines are for example: N-(hydroxyethyl)-hexamethylene diamine, N,N' - bis - (hydroxyethyl) - hexamethylene diamine and N,N'-bis-(hydroxypropyl)-hexamethylene diamine. Hydroxyalkyl diamines are as a rule obtained in ways well known in the art by reaction of aldehydes, for example formaldehyde, or alkylene oxides, for example ethylene oxide, propylene oxide and butylene oxide, with aliphatic, cycloaliphatic or aromatic diamines, for example with ethylene diamine, hexamethylene diamine, diaminocyclohexane, diaminodicyclohexyl, piperazine or phenylene diamine. The diamines may also contain hetero atoms, as for example in bis-(omega-aminohexyl)-amine. The addition of the aldehydes or alkylene oxides to the diamines may be effected singly or multiply with the formation of ether alcohols at one or both amino groups.

The hydroxyalkyl diamines are preferably used in the form of their dicarboxylic acid salts. Suitable dicarboxylic acids are aliphatic and aromatic dicarboxylic acids, such as for example succinic acid, adipic acid, pimelic acid, sebacic acid and phthalic acids.

In general, the polyamide-forming substances are polycondensed with additions of 1 to 15% of their weight of a mixture of hydroxyalkyl diamines and esters of polyhydric alcohols. The ratio of hydroxyalkyl diamines to carboxylic acid ester may be varied within the limits 1:5 to 5:1. As a rule it is recommended that equimolecular amounts of hydroxyalkyl diamine and ester should be used. The bulk density and the mechanical properties of the expanded articles which may be prepared from the expandable compositions depend markedly on the amount and the ratio of the additions. The hardness or plasticity of the expanded article may be adjusted within wide limits by using the ester or the hydroxyalkyl diamine in a molar excess. For example, by using an excess of hydroxyalkyl diamine, there are obtained expandable polyamides which can be worked up into expanded articles having greater plasticity.

The mixture of hydroxyalkyl diamine and carboxylic acid ester may be added to the polyamine-forming compounds prior to or during the condensation. Provision must be made for an intimate and uniform thorough mixing of the components. It is suitable to work at normal pressure, but the condensation may be carried out at increased or reduced pressure. In order to achieve particular properties it is sometimes advisable to add further substances, for example the carboxylic acid esters named in our copending application Ser. No. 753,217, filed August 5, 1958, e.g. ethyl benzoate, ethyl caprylate, methyl stearate, dimethyl oxalate, dimethyl phthlate or dimethyl terephthalate, or the oxamic acid or esters of oxamic acid named in our copending application Ser. No. 760,545, filed September 12, 1958.

The polycondensation temperature generally lies between 150° and 240° C., preferably between 180° and 240° C. In order to remove the water of reaction, the viscous mass formed during the condensation should be stirred at least periodically. It is therefore especially advantageous to carry out the polycondensation in heated kneaders. The polycondensation is generally continued until the polycondensates formed have $k$-values between 20 and 100, preferably between 25 and 80. The viscous plastic mass first formed may be converted into a fine expandable powder by further kneading at the reaction temperature. The reaction products may however also be ground to a powder after cooling.

Prior to being expanded, the expandable compositions are preferably converted into powder form according to conventional crushing methods. The expandable compositions prepared according to the process of this invention may be expanded to porous articles by heating in an oxygen-free atmosphere to temperatures which are higher than the temperatures at which they were formed. The temperatures are preferably higher than 250° C., but at least above the softening temperature of the polyamide used. They should not greatly exceed 340° C. In this way it is possible to prepare plates, rods, solid articles and hollow articles in various shapes.

In said copending application Ser. No. 753,217, filed August 5, 1958, there is described a process for the production of expandable and expanded polyamides. The said process differs from the process of the instant application in that, according to the earlier application, esters from carboxylic acids and monohydric aliphatic and cycloaliphatic alcohols having 1 to 6 carbon atoms are used instead of esters from carboxylic acids with 1 to 3 carbon atoms and polyhydric alcohols.

The following examples will further illustrate this invention but the invention is not restricted to these examples. The parts specified in the examples are parts by weight.

Example 1

100 parts of hexamethylene diamine adipate, 3.1 parts of N-(hydroxyethyl)-hexamethylene diamine and 1.5 parts of ethylene glycol diformiate are heated in an atmosphere free from oxygen for 2 hours at 200° C. while occasionally stirring. A viscous white composition is formed which, after cooling, is hard and brittle. It is ground to a powder and this is heated in a mold under nitrogen to 275° C. An expanded article of the bulk density 0.2 gram per cc. is obtained.

Example 2

100 parts of hexamethylene diamine adipate, 4 parts of N-(hydroxyethyl)-hexamethylene diamine adipate (or 3.1 parts of the free amine) and 3 parts of ethylene glycol diformiate are heated to 200° C. in a heatable kneader while flushing with nitrogen. After the water set free by the polycondensation has evaporated, the viscous plastic composition is further kneaded at 200° C., and disintegrates into a white powder. This powder is kneaded for another 2 hours at the same temperature. It has a $k$-value of 30 (measured in sulfuric acid).

By heating to 280° C. in a rectangular mold under nitrogen there forms an elastic expanded plate with a bulk density of 0.14 gram per cc.

Example 3

100 parts of hexamethylene diamine adipate, 4 parts of N-(hydroxyethyl)-hexamethylene diamine adipate (or 3.1 parts of the free amine), 1.5 parts of ethylene glycol diformiate and 0.8 part of oxamic acid ethyl ester are polycondensed to a white powder in the manner described in Example 2. It has a $k$-value of 35.

By heating under nitrogen there may be obtained therefrom an expanded article having a bulk density of 0.19 gram per cc.

Example 4

100 parts of hexamethylene diamine adipate, 3 parts of N-(hydroxyethyl)-hexamethylene diamine and 3 parts of glycerine formiate (consisting half of diformiate and half of triformiate) are polycondensed as in Example 2. The expandable powder has a $k$-value of 30.

By heating to 275° C. under nitrogen there is obtained an expanded article having the bulk density 0.12 gram per cc.

Example 5

96 parts of hexamethylene diamine adipate, 3.84 parts of N-(hydroxyethyl)-hexamethylene diamine adipate and 1.44 parts of ethylene glycol oxalate are thoroughly mixed and polycondensed in the manner described in Example 2. After the water formed during the polymerization has evaporated, the viscous mass is further kneaded at 200° C. and disintegrates into a white powder. This powder is then kneaded for another 1½ to 2 hours at the same temperature. The $k$-value of the product obtained in this manner is 40.

If the powder is heated in a suitable mold to 270° to 280° C. while flushing with nitrogen there is obtained an expanded article having a bulk density of 0.15 gram per cc.

Example 6

100 parts of hexamethylene diamine adiphate, 4 parts of N-(hydroxyethyl)-hexamethylene diamine adipate and 3 parts of pentaerythritol formiate are heated at 200° C. while flushing with nitrogen in a heatable kneader until the water formed during the polycondenstation has evaporated. Within about 4 hours there is obtained in this way a white powder with a $k$-value of 35.

By heating to 280° C. in a suitable mold there is obtained from the powder an elastic expanded article with a bulk density of 0.32 gram per cc.

We claim:

1. A process for the production of expandable polyamides which comprises condensing a mixture containing (1) a linear polyamide-forming composition selected from the group consisting of mixtures of an aliphatic dicarboxylic acid and an aliphatic diamine, aliphatic dicarboxylic acid salts of aliphatic diamines, omega-amino carboxylic acids, lactams, and mixtures thereof, (2) an ester of a carboxylic acid having 1 to 3 carbon atoms with an alcohol selected from the group consisting of polyhydric aliphatic and cycloaliphatic alcohols, and (3) a hydroxyalkyl diamine of the general formula:

$$H(OR_1)_n\text{---}NH\text{---}X\text{---}NH\text{---}(R_2O)_mH$$

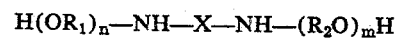

in which X is a divalent radical selected from the group consisting of aliphatic, cycloaliphatic and aromatic radicals, $R_1$ and $R_2$ are alkylene radicals with 1 to 4 carbon atoms, and $n$ and $m$ are whole numbers falling in the range of 0 to 7, inclusive, the total of $n$ plus $m$ being at least 1, at a temperature between about 150° and 240° C. until the condensate formed has a $k$-value between 20 and 100, the ratio of the carboxylic acid ester to the hydroxyalkyl diamine lying within the limits 1:5 to 5:1, and the amount of the carboxylic acid ester and the hydroxyalkyl diamine being from 1 to 15% by weight with respect to the polyamide-forming compound.

2. A process according to claim 1 wherein said carboxylic acid is formic acid.

3. A process according to claim 2 wherein said carboxylic acid is oxalic acid.

4. A process according to claim 1 wherein said polyhydric alcohol is ethylene glycol.

5. A process according to claim 1 wherein said polyhydric alcohol is propylene glycol.

6. A process according to claim 1 wherein said polyhydric alcohol is glycerine.

7. A process according to claim 1 wherein said hydroxyalkyl diamine is used in the form of its salt with a dicarboxylic acid.

8. A process according to claim 7 wherein said dicarboxylic acid is a member selected from the group consisting of succinic acid, adipic acid, pimelic acid, sebacic acid and phthalic acids.

9. A process according to claim 1 wherein said hydroxyalkyl diamine is a member of the group consisting of N-(hydroxyethyl)-hexamethylene diamine, N,N'-bis-(hydroxyethyl)-hexamethylene - diamine and N,N'-bis-(hydroxypropyl)-hexamethylene diamine.

10. A process for the production of expanded polyamides wherein an expandable polyamide prepared according to claim 1 is heated to a temperature above its softening point, said temperature being below the temperature at which the polyamide decomposes.

11. A process for the production of expanded polyamides wherein an expandable polyamide prepared according to claim 6 is heated to a temperature above its softening point, said temperature being below the temperature at which the polyamide decomposes.

12. A process according to claim 2 wherein said linear polyamide-forming composition is hexamethylene diamine adipate.

No references cited.